United States Patent [19]

Glick et al.

[11] Patent Number: 4,955,405

[45] Date of Patent: Sep. 11, 1990

[54] PREFABRICATED CAR WASH DISTRIBUTION AND DELIVERY SYSTEM AND METHOD

[75] Inventors: Dennis Glick, Media; Nicholas Vale, Exton; Michael McDade, Oxford; Richard Vogel, West Grove, all of Pa.

[73] Assignee: White Glove, Inc., Radnor, Pa.

[21] Appl. No.: 471,049

[22] Filed: Jan. 26, 1990

Related U.S. Application Data

[63] Continuation of Ser. No. 213,850, Jun. 30, 1988.

[51] Int. Cl.⁵ .................. B60S 3/04; F16L 5/00
[52] U.S. Cl. .................. 137/234.6; 137/357; 134/123; 239/209
[58] Field of Search .............. 137/234.6, 357, 356, 137/343, 123; 239/208, 209

[56] References Cited

U.S. PATENT DOCUMENTS

| | | | |
|---|---|---|---|
| 2,023,433 | 12/1935 | McConnell | 247/3 |
| 2,037,895 | 4/1936 | Gugler | 137/357 X |
| 2,922,173 | 1/1960 | Lind et al. | 134/123 X |
| 3,299,901 | 1/1967 | Axe et al. | 239/209 X |
| 3,422,827 | 1/1969 | McCulloch | 239/209 X |
| 3,494,657 | 2/1970 | Tantlinger et al. | 296/28 |
| 3,529,611 | 9/1970 | Daum et al. | 239/209 X |
| 3,670,764 | 6/1972 | Tindal | 137/357 |
| 3,701,356 | 10/1972 | Henna et al. | 134/123 X |
| 3,774,625 | 11/1973 | Wiltrout | 134/123 X |
| 3,774,631 | 11/1973 | Willkins | 137/357 |
| 3,793,793 | 2/1974 | Dobbins | 52/221 |
| 3,844,480 | 10/1974 | Taylor et al. | 239/209 X |
| 4,232,845 | 11/1980 | Turner | 248/49 |
| 4,374,530 | 2/1983 | Walling | 138/110 |
| 4,644,094 | 2/1987 | Hoffman | 174/47 |

*Primary Examiner*—John Rivell
*Attorney, Agent, or Firm*—Ratner & Prestia

[57] ABSTRACT

A system and method for constructing a car wash which involves prefabricating a raceway equipped with lines and hoses for delivering car wash supplies to car washing equipment. This raceway is folded and transported to the car wash location where it is unfolded and connected to car wash equipment and sources for car wash supplies with a minimum of time, effort and trained personnel.

13 Claims, 6 Drawing Sheets

PREFABRICATED CAR WASH DISTRIBUTION AND DELIVERY SYSTEM AND METHOD

This application is a continuation, of application Ser. No. 07/213,850, filed June 30, 1988 now abandoned.

FIELD OF THE INVENTION

This invention relates to automated drive-through car washes. More specifically, it relates to the installation of lines and conduits to carry electrical and hydraulic power and liquid supplies to car washing equipment.

BACKGROUND OF THE INVENTION

The building of car washes normally requires expertise in several different areas. After a suitable location has been secured, the floor plan of the building must be laid and the car washing equipment position determined. The building generally consists of a "tunnel" (in which the car washing equipment is located and where the car is washed) and a "mechanical room" where the controls for the equipment are kept. The distribution and delivery of power and supplies to such equipment must then be designed. Since each car wash building is slightly different, each layout for the equipment is also slightly different, and the design of a system for the distribution and delivery of supplies for the equipment previously required individual attention for each car wash. The design and installation of such a system requires considerable expertise in the areas of plumbing, electricity and hydraulics. Skilled plumbers and electricians employed in the construction must also be specifically experienced in car wash equipment.

Until now, the building of a car wash in a remote location required a considerable expenditure of time and effort. It was required that the builder travel to the location in order to contract skilled electricians, plumbers, and equipment installation personnel in order to ensure their availability as necessary for the installation.

Once these experienced technicians had been scheduled, it was required that they design, and subsequently install chemical, electrical and hydraulic distribution systems to deliver supplies to the equipment to be used in the car wash. This required a large expenditure of time and concerted effort by these skilled technicians, resulting in a high cost to the builder.

After installation of the equipment and supply distribution and delivery systems, these systems were subject to inspection and approval by local officials. In view of the fact that the systems were designed and built specifically for the single car wash in which they were located, these inspections were often rigorous. Occasionally parts of the systems might need to be replaced in order to meet municipal codes. Additionally, the entire design and installation would have to be supervised by representatives of the builder in order to ensure the system met the builder's standards.

Other problems with prior car wash supply distribution systems include a difficulty in servicing defective or worn out parts such as valves or solenoids because they may be permanently installed as parts of the plumbing. Additionally these valves or solenoids may be located in the car wash tunnel, increasing the deleterious exposure to chemicals and water used in the car washing process.

The plumbing, hydraulic and electrical lines must normally be secured to the walls of the car wash tunnel for support. This greatly hinders the task of cleaning the walls of the tunnel. Dirt and grime are thus more likely to accumulate and associated problems arise.

If the supplies of chemicals were also located in the car wash tunnel, the tunnel itself might need to be heated, as some of the chemicals would suffer adverse effects from low temperatures. If this were the case (as it normally is in northern climes) an additional problem arises since the viscosity of the concentrated chemicals to be used in the car wash increases substantially at low temperatures. This causes problems in the dilution of the chemical since the viscosity affects the dilution at the venturi (Dema) valve.

SUMMARY OF THE INVENTION

The invention comprises a prefabricated raceway which is manufactured remote from the car wash location. The raceway is equipped with lines and conduits for supplying the equipment. The raceway and lines (collectively "delivery system") are shipped to the car wash location and can be installed quickly and easily with a minimum of skilled personnel.

Along with this delivery system is a distribution rack for controlling the flow of liquid supplies to the car wash equipment. The distribution rack comprises a series of pumps, valves, solenoids and venturis for mixing and distributing the chemicals. This rack is also manufactured remote from the car wash location and shipped as a complete unit, ready for installation. An electrical cabinet and a hydraulic reservoir/pump system are also shipped premanufactured and ready for installation. Therefore, much of the skilled labor normally associated with the construction of a car wash may be eliminated by the use of these modular units, each one premanufactured for easy installation upon delivery at the car wash location.

DETAILED DESCRIPTION OF A PREFERRED EMBODIMENT

This invention is designed to simplify the building of a car wash in terms of time, effort and money expended. By producing a car wash supply system 10 shown in FIG. 8, comprising a car wash supply delivery system 20, a car wash distribution rack 40, a car wash electrical cabinet 88 and a car wash hydraulic source 90, remote from the car wash location and shipping to the car wash, the time for construction of the car wash is significantly reduced along with problems associated therewith.

Figure 8:
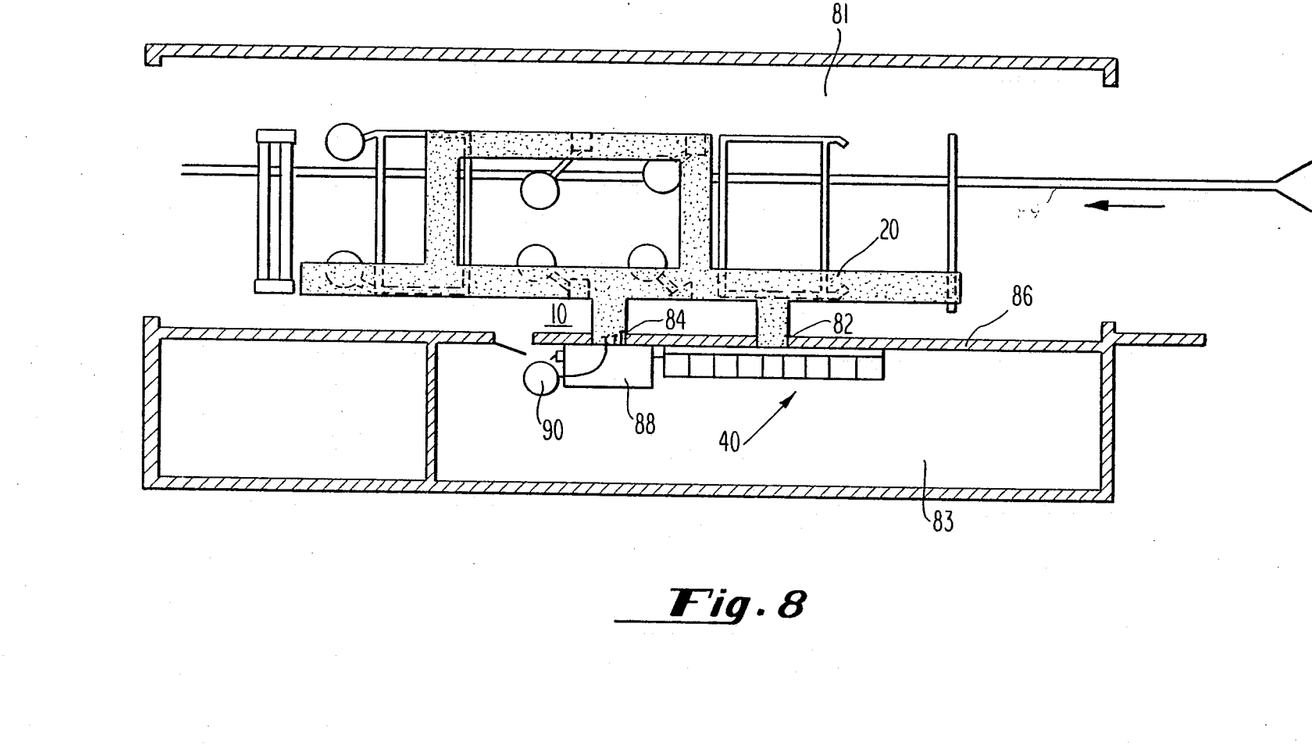
FIG. 8 is a schematic layout of the completed car wash.

FIG. 8 shows a schematic layout of the car wash after completion. When building the car wash, the site for the car wash must be selected. After selection of the site for the car wash, plans for the building are laid and the building is constructed. The building will norma tunnel 81 through which the car is driven or pulled by conveyor 89 and where the car washing equipment is located. The building should also have another room 83, referred to as the mechanical room.

The controls for running the car wash equipment and equipment for furnishing it with supplies are located in mechanical room 83. This equipment generally includes a distribution rack 40, an electrical cabinet 88 and a hydraulic power source 90. These pieces of equipment are connected to car wash delivery system 20 by lines passing through holes 82 and 84 in wall 86 which divides mechanical room 83 from tunnel 81. These holes (82 and 84) are generally placed high in wall 86, since the delivery system 20 is normally located above the car washing equipment. Delivery system 20 passes through these holes and thereby provides a smooth surface for the lines from delivery system 20 to equipment 90, 88, and 40. These lines therefore do not rest on the cinderblock (or other material) of wall 86 and are somewhat protected from abrasion which would be caused by wall 86 when the lines moved upon being switched on and off. Generally hydraulic lines and electrical lines will pass through hole 84 which is closest to electrical cabinet 88 and hydraulic power source 90. Fluid supply lines will generally pass through hole 82 which is located nearest distribution rack 40.

Figure 1:
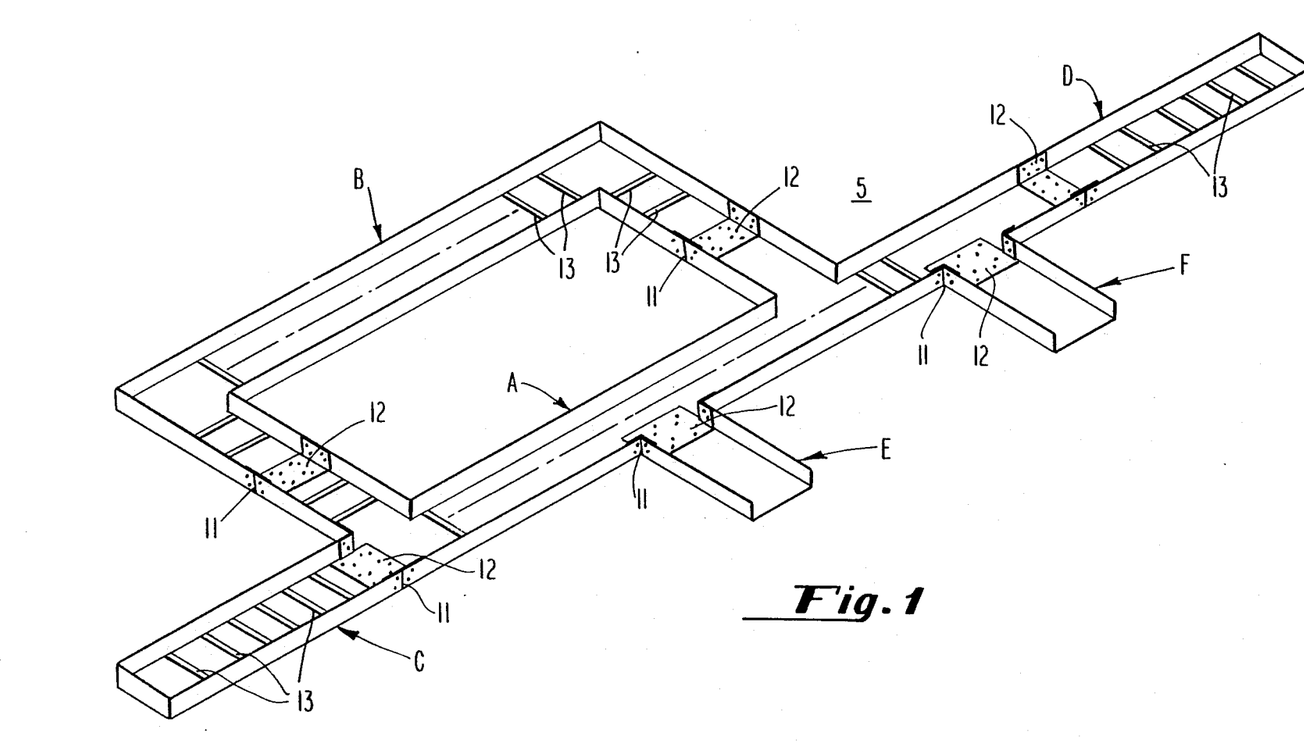
FIG. 1 is a perspective view of the empty raceway.

FIG. 1 shows a raceway 5 used as the basis for the delivery system described herein. This raceway 5 may be made out of any rigid material, but is commonly made from aluminum or galvanized steel in order to increase longevity by preventing rusting of the raceway. The exact configuration of the raceway will normally vary from car wash to car wash.

As shown in FIG. 1 the raceway is manufactured in several pieces, A, B, C, D, E, and F. These are joined together at "folds" 11 by plates 12 secured in place by nuts and bolts. The raceway is equipped with tracks 13 which allow hydraulic, water and chemical delivery tubing, pipes for recycle water and electrical conduits to be secured to the raceway.

Figures 2, 3:
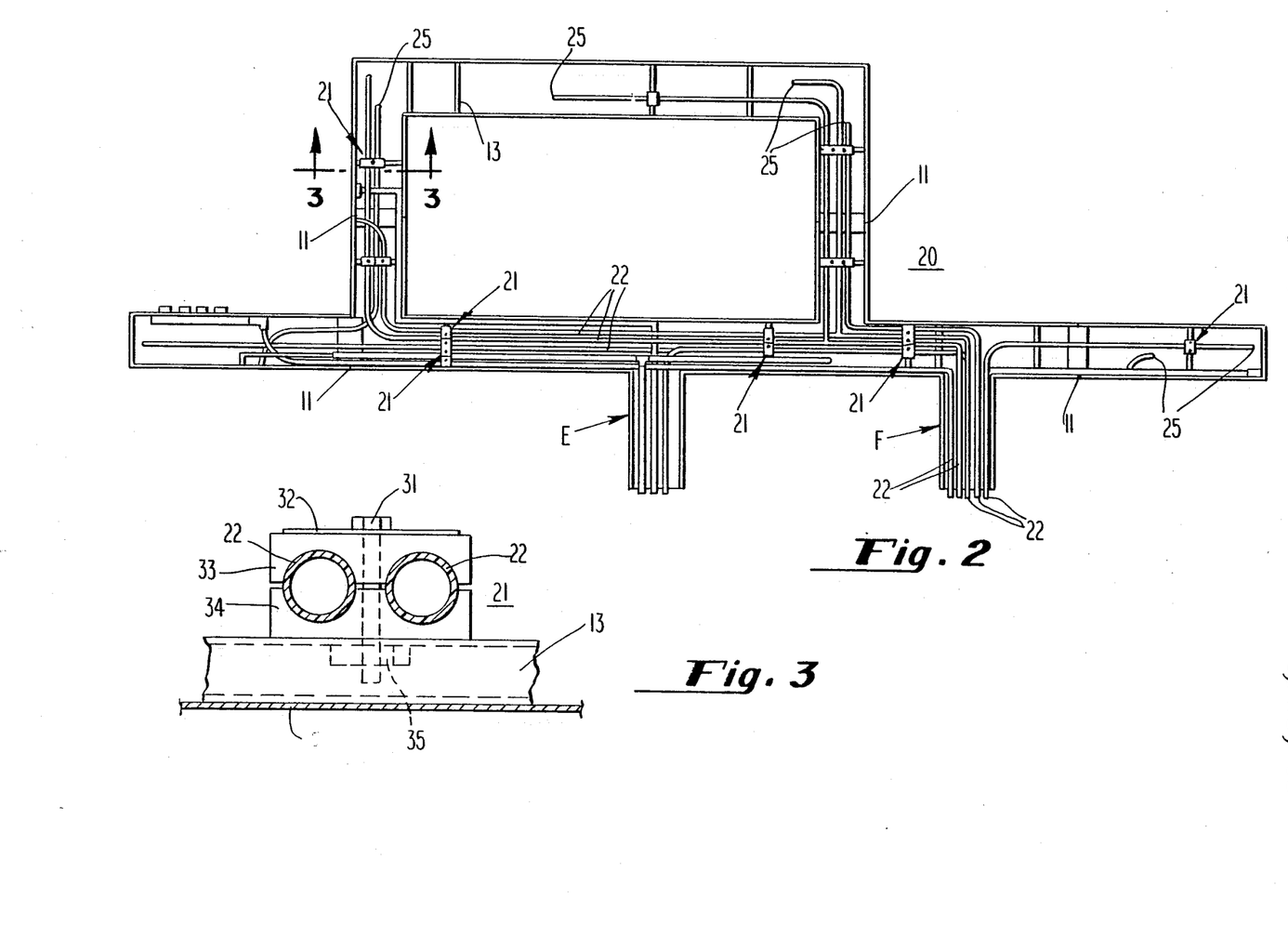
FIG. 2 is a plan view of the completed raceway.
FIG. 3 is the cross-sectional view of the lines as secured to the raceway.

The chemical delivery system is manufactured at a factory remote from the car wash. Once the raceway 5 has been made, lines and conduits 22 for delivery of supplies are secured to it. As shown in FIG. 2, these supply lines 22 enter the raceway through sections E and F. The lines are secured to the raceway by means of pillow blocks 21. A cross-section of such a pillow block is shown in FIG. 3.

The lines or conduits 22, are secured to raceway 5 by means of molded plastic blocks 33 and 34 secured to track 13 by bolt 31 and threaded fastener 35. This pillow block assembly, collectively 21, includes a pressure spreader 32, to distribute pressure from bolt 31 evenly across plastic block 33.

Electrical and recycle (water and hydraulic) lines also enter the raceway through sections E and F. These lines are secured to the raceway 5 through the use of fasteners regularly employed for this purpose. In order to allow convenient connection to car washing equipment, supply lines 22 are connected to couplings 25 which pass through the raceway and may be connected to other fluid lines 72 (see FIG. 7) which lead to the car washing equipment.

The entire delivery system, including the raceway 5 with all attached hoses and connections, is manufactured at a plant remote from the intended car wash facility. At the same time as this delivery system 20 is being manufactured, distribution rack 40 to control the flow of supplies to the car wash equipment is also being manufactured. Distribution rack 40 is shown in detail in FIG. 4.

Figure 4:
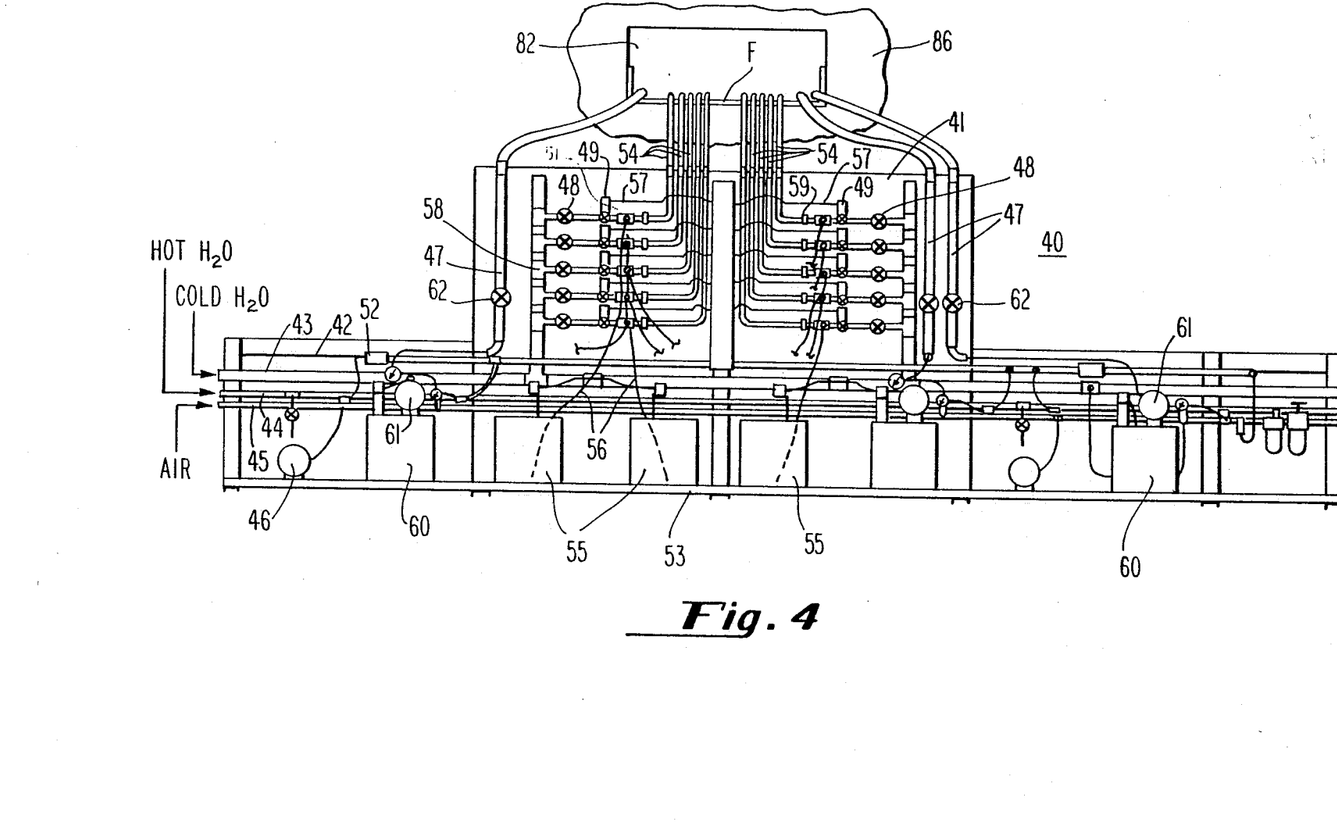
FIG. 4 is a plan view of the chemical distribution rack.

Distribution rack 40 comprises mounting frame 41, made of aluminum or other similar sturdy material. The frame is L-shaped and has a shelf/ portion 53. Apparatus for controlling the flow and distribution of liquid supplies to the car wash equipment is mounted on this frame as will be discussed.

Cold water is delivered to the distribution rack and to the car wash equipment via cold water pipe 43. Hot water is similarly delivered where needed via hot water pipe 44. A high pressure air line 45 supplies compressed air to mixers and foamers so that chemicals may be prepared for distribution to the car washing equipment. Electrical power is supplied to the pumps and mixers mounted on the distribution rack via electrical line 42.

The operation of the distribution rack is best illustrated by an example of the route a chemical takes before getting to the car washing equipment. Soap or other concentrated chemical is stored in buckets 55. Cold water enters the system through cold water pipe 43. The cold water travels up through extension pipe 58 to valves 48. Each valve controls the flow to an output line 54. These lines are generally color-coded to aid installation at the car wash facility. When valve 48 is opened, cold water is allowed to flow to solenoid actuated dema valve 49. Dema valve 49 is remotely controlled by electrical line 57. When Dema valve 49 is open water flows past venturi 51. As this occurs, concentrated chemical is drawn through supply tube 56 from chemical supply bucket 55. The chemical and water mixture then flows out of the distribution rack through a line 54, to the overhead distribution system.

The Dema valves and solenoids are somewhat fragile and breakdown occurs periodically. This normally requires considerable down time for whichever piece of equipment the broken valve serves, while the problem is located and repaired. The present invention overcomes this problem in two possible ways. First, an extra line with a Dema valve 49 and solenoid is supplied, although unused most of the time. If a solenoid or venturi fails, simply switching the output line 54 and supply line 56 from the malfunctioning valve to the corresponding positions on the spare will enable continued operation of the car washing equipment with a minimum of down time. Furthermore, the Dema valve and solenoid may be quickly and easily disconnected from the distribution rack at connection 59 and valve 48. This allows for easy removal and replacement of defective valves.

In some cases chemicals must be delivered to the equipment in the form of foams. In such cases the concentrated chemical is drawn from a supply bucket 60 and foamed in a pump 61 through use of compressed air supplied by line 45. This foam is then pumped to valve 62 and through supply line 47 to delivery system 20.

Some chemicals must be mixed before they are injected into the water line at 51. This can be performed through mixer 46 drawing directly out of a chemical supply drum (not shown). Electrical power is supplied to the mixer by line 42 via junction box 52.

Figure 6:
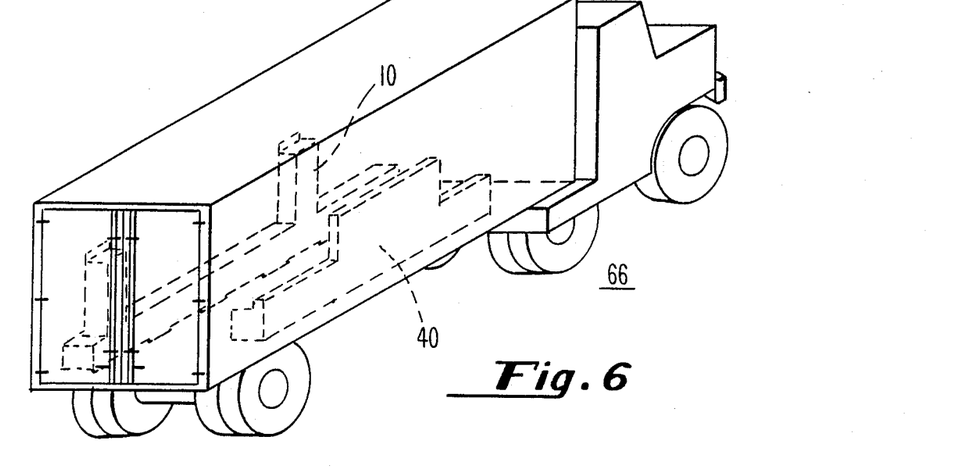
FIG. 6 is a perspective view of the raceway and chemical distribution rack in transit.

Once distribution rack 40 and delivery system 20 have been manufactured, they must be transported to the intended sight of the car wash. Distribution rack 40 is of such a size that it may be easily placed inside of delivery truck 66 as shown in FIG. 6. However delivery system 20 is of such a size that it would not normally fit inside of such delivery truck, making transportation of the delivery system extremely difficult. This problem has been solved. Referring to FIG. 1, one can see that raceway 5 is separated at several "folds" 11. These "folds" are actually simply separations in raceway 5. When plates 12 are disconnected, the different sections (A, B, C, etc.) of raceway 5 are still joined together by supply lines 22. The different sections can then be "folded" for shipping. The raceway is held together at these "folds" with plates 12.

Figure 5:
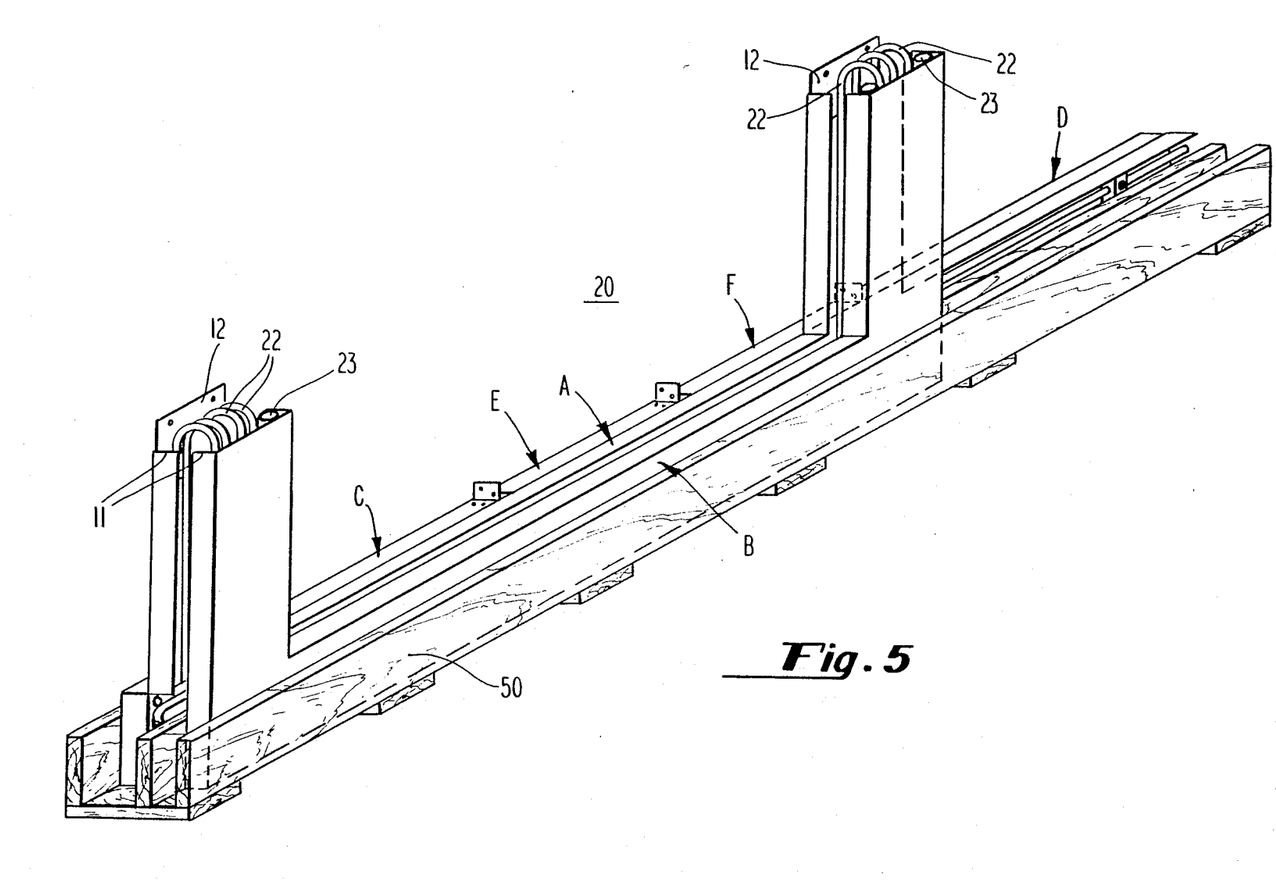
FIG. 5 is a perspective view of the raceway as folded and packed for shipping.

When delivery system 20 is transported to the car wash site, plates 12 are detached and the delivery system is "folded" at folds 11. The delivery lines connected to raceway 11 are generally flexible and can be bent as shown in FIG. 5. However, some of the pipes required for the car wash are rigid and thus cannot be bent. These pipes are separated at the folds and can be reconnected once the raceway has been installed. Pipes of this type are shown as 23 in FIG. 5. Once raceway 5 has been folded, it is packed in crate 50 and can then be transported in truck 66 as shown in FIG. 6.

Once the delivery system 20 and distribution rack 40 have been transported to the desired site, the delivery system is removed and unfolded. Plates 12 are reattached by bolts and the delivery system 20 is unified. Delivery system 20 is then mounted in tunnel 81. This mounting of the delivery system will now be described.

Figure 7:
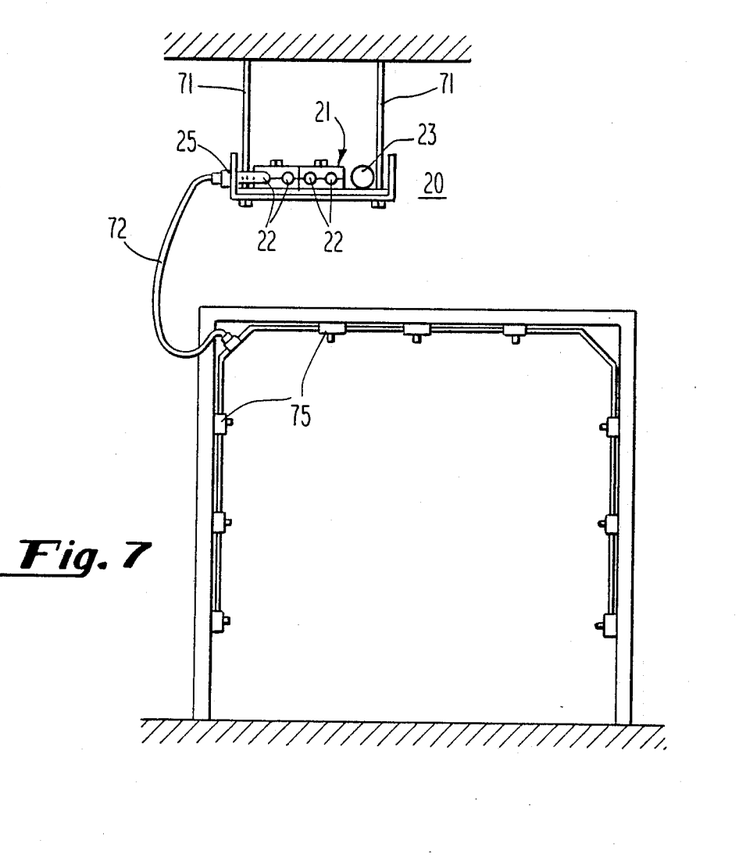
FIG. 7 is a cross-sectional view of the installed raceway showing connections to car washing equipment.

The delivery system is brought into tunnel 81, and unfolded as previously described. The delivery system may then be either mounted from the ceiling, or supported by the car wash equipment itself. Such ceiling mounting is shown in FIG. 7. Hangers 71 are used to secure the delivery system to the ceiling. Flexible supply lines 22 (secured to raceway 5 with pillow blocks 21) pass through raceway 5 by way of coupling 25. Fluid line 72 is attached to the other side of coupling 25, at the car wash site. Fluid line 72 delivers supplies to car wash equipment 75.

As shown in FIG. 8, the delivery system extends through openings 82 and 84 in wall 86 which divides the maintenance room from the tunnel. These openings are generally small and high up on the wall 86. The connections from hydraulic source 90, electrical cabinet 88, and distribution rack 40 are made to the distribution system through these openings. Since delivery system 20, distribution rack 40, electrical cabinet 88 and hydraulic source 90 are modularized, the connection of this equipment involves a minimum of time, effort and skilled labor. That is, most of the job may be done quickly by unskilled laborers working under the supervision of trained personnel.

Distribution rack 40 is removed from the truck and mounted on the wall 86 in mechanical room 83 shown in FIG. 8. The delivery system is shown as 20 in FIG. 8. It is mounted above the car washing equipment in the car washing tunnel 81. Connections from the distribution rack to the delivery system are made through a opening 82 in the wall of mechanical room 83. Delivery system 20 projects through these openings as shown in FIG. 8. Hydraulic and other connections are made from the delivery raceway through opening 84 in the wall of mechanical room 83. The lines from delivery system 20 are generally color-coded, as are those of distribution rack 40, for ease of location and connection at the time of installation.

Locating distribution rack 40 in mechanical room 83 has the additional advantage that chemicals required for the car washing equipment can be kept above their freezing point by heating only maintenance room 83 without it being necessary to heat tunnel 81. This overcomes any problems of choosing between a large energy expenditure to heat tunnel 81 or allowing chemicals to freeze and thus loose their efficacy.

Also located in mechanical room 83 is electrical cabinet 88. Electrical cabinet 88 may also be prefabricated remote from the car wash location complete with electrical components. This equipment includes switches, relays and starters and any other electrical components needed to control the flow of electrical power to the car washing equipment.

These components are all installed in the cabinet prior to shipping to the car wash location. This enables the builder of the car wash to provide electricity where necessary without the need for extensive skilled labor. Generally, an electrician is required only for connection of cabinet 88 to the main source of power.

Once cabinet 88 is secured in the building, electrical lines can be connected from the cabinet to electrically operated equipment as necessary. These electrical connections are also pre-planned, since every piece of equipment has been planned for. Where necessary, the electrical lines are also passed through raceway 5 to provide electricity to equipment in the tunnel. In addition, electrical lines for lights and other uses may be conventionally installed from cabinet 88.

The electrical components in the cabinet 88 are generally remotely computer controlled, and the on/off sequence varies with the particular car wash cycle which each customer has selected.

Finally, also located in mechanical room 83 is prefabricated hydraulic source 90. This comprises a single pool of hydraulic fluid, and several conventional hydraulic pumps. Each pump powers a separate piece of equipment.

Since the entire operation is preplanned, this hydraulic power source may also be premanufactured, and shipped to the car wash location ready to be installed. Once installed the hydraulic source is connected to the electrical cabinet as a power source. The pumps are then connected to the car washing equipment in the tunnel via hydraulic lines which have previously been installed in the raceway.

Each pump has one hydraulic line to power one piece of equipment. However, since there is one large pool of hydraulic fluid (not shown), the hydraulic return lines from all of the equipment may be unified and thus only one line returns to the hydraulic fluid pool. The single pool of hydraulic fluid helps in keeping the hydraulic fluid cool. If each separate piece of equipment had a separate hydraulic pool, high use equipment would cause hydraulic fluid to heat up, with an increase in associated problems. The use of a single hydraulic pool overcomes this problem.

I claim:

1. A system for the distribution and delivery of supplies to car wash equipment through delivery lines in a car wash tunnel comprising:

a raceway carrying said delivery lines;

means for mounting said raceway in the tunnel;

a distribution rack mounted in a separate mechanical room;

an opening between said tunnel and said mechanical room for receiving supply lines between said raceway and rack;

means for coupling supply lines to said equipment and rack to deliver substantially all desired supplies to said car wash equipment;

said delivery lines being connected to said car wash equipment.

2. The system of claim 1 wherein said raceway comprises separate sections, said sections being severable and reattachable.

3. The system of claim 2 wherein said raceway is foldable for ease of transportation.

4. The system of claim 1 installed in a car wash.

5. The system of claim 1 wherein said supplies comprise water, detergent, wax, air and hydraulic and electrical power.

6. A prefabricated system for distributing liquid supplies to car washing equipment in a car wash comprising:

a mounting frame;
means for mixing liquid chemicals with water and air;
means for regulating the flow of water and chemicals;
means for directing said water and chemicals to said car washing equipment, said means for directing including fluid carrying lines;
said means for mixing, regulating and directing being secured to said mounting frame.

7. The system of claim 6 including an extra, normally unused valve which extra valve can be expeditiously exchanged for a malfunctioning valve.

8. The system of claim 6 including means for mounting said rack on a wall of the car wash maintenance room.

9. A method for constructing and installing a system for delivering supplies to car wash equipment, which method comprises the steps of:

forming a raceway remote from an intended location for a car wash;

equipping said raceway with means for delivering supplies to car washing equipment;
folding said delivery system;
transporting said delivery system to said intended location;
unfolding said delivery system;
mounting said delivery system in the tunnel of said car wash;
connecting said delivery system to car washing equipment located in said tunnel; and
connecting said delivery system to a source of supplies for car washing equipment.

10. A method of transporting and installing a car wash supply distribution and delivery system having delivery lines in a car wash tunnel, which lines deliver substantially all desired supplies to car wash equipment in said car wash tunnel, comprising:

forming a car wash supply delivery and distribution system comprising a raceway carrying the delivery lines, and a distribution rack;
folding said raceway and lines;
shipping said raceway and lines and distribution rack to said car wash tunnel;
unfolding said raceway and lines;
forming at least one opening from said car wash tunnel to a separate mechanical room;
mounting said distribution rack in said mechanical room,
mounting said raceway and lines in said tunnel, and connecting said delivery lines through said openings to said distribution rack.

11. The method of claim 10 wherein said raceway is hung from the ceiling of said car wash tunnel.

12. The method of claim 10 wherein at least part of raceway forms a closed polygon.

13. The method of claim 10 wherein said raceway is mounted through said opening.

* * * * *

UNITED STATES PATENT AND TRADEMARK OFFICE
CERTIFICATE OF CORRECTION

PATENT NO. : 4,955,405

DATED : September 11, 1990

INVENTOR(S) : Dennis Glick, Nicholas Vale, Michael McDade, Richard Vogel, Jay Rees It is certified that error appears in the above—identified patent and that said Letters Patent is hereby corrected as shown below:

ON THE TITLE PAGE: Item [75[ should read;

75 Inventors: Dennis Glick, Media; Nicholas Vale, Exton; Michael McDade, Oxford; Richard Vogel, West Grove; Jay Rees, Collegeville; all of Pa.

Signed and Sealed this

Thirty-first Day of March, 1992

*Attest:*

HARRY F. MANBECK, JR.

*Attesting Officer*     *Commissioner of Patents and Trademarks*